US011964897B2

(12) United States Patent
Cooper

(10) Patent No.: US 11,964,897 B2
(45) Date of Patent: Apr. 23, 2024

(54) HISTORICALLY ACCURATE SIMULATED DIVIDED LIGHT GLASS UNIT AND METHODS OF MAKING THE SAME

(71) Applicants: THE COOPER GROUP, LLC, Pawcatuck, CT (US); Brian M. Cooper, North Stonington, CT (US)

(72) Inventor: Brian M. Cooper, North Stonington, CT (US)

(73) Assignee: The Cooper Group, LLC, Pawcatuck, CT (US)

( * ) Notice: Subject to any disclaimer, the term of this patent is extended or adjusted under 35 U.S.C. 154(b) by 0 days.

(21) Appl. No.: 18/023,041

(22) PCT Filed: Aug. 31, 2021

(86) PCT No.: PCT/US2021/048456
§ 371 (c)(1),
(2) Date: Feb. 24, 2023

(87) PCT Pub. No.: WO2022/047385
PCT Pub. Date: Mar. 3, 2022

(65) Prior Publication Data
US 2023/0265004 A1  Aug. 24, 2023

Related U.S. Application Data

(60) Provisional application No. 63/072,546, filed on Aug. 31, 2020.

(51) Int. Cl.
*E06B 3/66* (2006.01)
*B33Y 10/00* (2015.01)
(Continued)

(52) U.S. Cl.
CPC .......... *C03B 23/0252* (2013.01); *B33Y 10/00* (2014.12); *B33Y 80/00* (2014.12);
(Continued)

(58) Field of Classification Search
CPC .. E06B 3/6604; E06B 3/66309; E06B 3/6715; E06B 3/67326; E06B 2003/67395;
(Continued)

(56) References Cited

U.S. PATENT DOCUMENTS 2,408,526 A * 10/1946 Minton ............... C03B 23/0252
65/287
3,226,903 A * 1/1966 Lillethun ............. E06B 3/6604
52/456

(Continued)

FOREIGN PATENT DOCUMENTS

CN       100564087 C  * 12/2009  ......... C03B 23/0252
EP       1391433 A2  * 2/2004   ............. C03B 19/02
(Continued)

OTHER PUBLICATIONS

International Search Report and the Written Opinion of the International Searching Authority, International Application No. PCT/US2021/048456, dated Dec. 21, 2021.

(Continued)

*Primary Examiner* — Ryan D Kwiecinski
(74) *Attorney, Agent, or Firm* — Murtha Cullina, LLP

(57) ABSTRACT

The insulated glass unit (IGU) that replicates a historic glass window includes a single simulated divided light glass pane, a low-e glass layer, and spacer grills disposed therebetween. True divided light glass window panes are scanned to obtain surface characteristic data, subsequently used to design a pane that includes slumped areas corresponding to the unique topological characteristics of antique glass, separated by flat areas. The flat surfaces provide for sealing the IGU with the spacer grills, while the optics of the original historic glass are preserved via the slumped areas. A mold of the designed pane is then 3D printed in furan resin sand, and a glass layer is melted over the mold to create a one-piece pane that includes the antique features. Accurate replication (Continued)

of these windows enables historic building renovation with modern insulated windows with less sealing while retaining the original appearance, providing improvements in longevity and efficiency.

19 Claims, 5 Drawing Sheets

(51) Int. Cl.
*B33Y 80/00* (2015.01)
*C03B 23/02* (2006.01)
*C03B 23/025* (2006.01)
*E06B 3/663* (2006.01)
*E06B 3/67* (2006.01)
*E06B 3/673* (2006.01)

(52) U.S. Cl.
CPC ........ *E06B 3/6604* (2013.01); *E06B 3/66309* (2013.01); *E06B 3/6715* (2013.01); *E06B 3/67326* (2013.01)

(58) Field of Classification Search
CPC ....... B33Y 10/00; B33Y 80/00; B29C 64/393; B32B 17/10247; C03B 23/0026; C03B 23/0052; C03B 23/0258; Y10T 428/24628; Y10T 428/24736
See application file for complete search history.

(56) References Cited

U.S. PATENT DOCUMENTS

| | | | |
|---|---|---|---|
| 4,783,938 A | 11/1988 | Palmer | |
| 4,838,006 A * | 6/1989 | Grosch | B60J 1/001 52/786.13 |
| 4,909,822 A * | 3/1990 | Kitaya | C03B 23/0307 65/273 |
| 4,989,384 A | 2/1991 | Kinghorn et al. | |
| 5,325,579 A | 7/1994 | Baier | |
| 5,558,827 A * | 9/1996 | Howes | B32B 17/10036 264/220 |
| 5,834,124 A * | 11/1998 | Pease, III | B32B 17/10045 428/458 |
| 6,257,022 B1 * | 7/2001 | Caplan | C03B 23/0252 65/287 |
| 6,301,852 B1 | 10/2001 | Eshelman | |
| 6,311,455 B1 * | 11/2001 | Gerard | E06B 3/6604 52/786.13 |
| 6,425,221 B1 | 7/2002 | Reichert | |
| 6,640,510 B2 * | 11/2003 | Kane | B44C 5/0407 52/204.59 |
| 7,114,353 B1 * | 10/2006 | Charlton | E06B 3/6608 65/93 |
| 7,589,868 B2 | 9/2009 | Velde et al. | |
| 7,729,506 B2 | 6/2010 | Carlson | |
| 7,841,212 B2 * | 11/2010 | Wang | C03B 23/22 65/102 |
| 7,854,097 B2 | 12/2010 | Schlyper et al. | |
| 7,856,851 B2 * | 12/2010 | Chiappetta | C03B 35/202 65/273 |
| 7,950,193 B1 * | 5/2011 | Plummer | E06B 9/01 52/204.593 |
| 8,171,643 B1 * | 5/2012 | Plummer | G09B 25/04 29/897.3 |
| 8,225,562 B2 * | 7/2012 | Parker | E06B 3/6604 52/311.2 |
| 8,731,699 B2 | 5/2014 | Nagy et al. | |
| 8,923,650 B2 | 12/2014 | Wexler | |
| 10,286,630 B2 * | 5/2019 | Boek | B32B 3/08 |
| 10,329,832 B2 | 6/2019 | Briese et al. | |
| 10,464,339 B2 | 11/2019 | Hansson et al. | |
| 10,518,477 B1 | 12/2019 | Williamson | |
| 10,900,274 B2 * | 1/2021 | Anderson, III | E06B 3/6612 |
| 11,073,715 B2 * | 7/2021 | Fukushi | C03B 23/0357 |
| 2003/0126812 A1 | 7/2003 | Folsom et al. | |
| 2014/0093702 A1 * | 4/2014 | Kitajima | B32B 17/10045 65/24 |
| 2015/0000341 A1 * | 1/2015 | Bisson | C03B 23/0258 65/273 |
| 2015/0101274 A1 * | 4/2015 | Rehme | E06B 3/5878 52/204.62 |
| 2015/0103514 A1 * | 4/2015 | White | B29C 64/386 362/97.4 |
| 2016/0194236 A1 * | 7/2016 | Ghigo | C03B 40/005 65/23 |
| 2016/0221869 A1 * | 8/2016 | Grzybowski | E06B 3/66347 |
| 2016/0311717 A1 * | 10/2016 | Nieber | C03B 23/02 |
| 2017/0274556 A1 | 9/2017 | Gardiner | |
| 2018/0066468 A1 * | 3/2018 | Anderson, III | E06B 3/6612 |
| 2019/0055151 A1 * | 2/2019 | Heo | C03B 23/0235 |
| 2019/0248073 A1 * | 8/2019 | Afshar Mohajer | B29C 64/393 |

FOREIGN PATENT DOCUMENTS

| | | | | |
|---|---|---|---|---|
| FR | 2855168 A1 * | 11/2004 | ......... | C03B 23/0252 |
| GB | 2140348 A * | 11/1984 | ....... | B32B 17/10045 |
| GB | 2334289 A * | 8/1999 | ........... | E06B 3/6604 |
| GB | 2349362 A * | 11/2000 | ........... | B44C 5/0407 |
| GB | 2415989 A * | 1/2006 | ......... | C03B 23/0252 |
| GB | 2455966 A * | 7/2009 | ......... | G05B 19/4097 |
| GB | 2455966 B | 7/2009 | | |
| GB | 2550838 A * | 12/2017 | ............. | B44C 5/08 |
| WO | 2001012940 A1 | 2/2001 | | |
| WO | WO-03004424 A2 * | 1/2003 | ........... | C03B 23/023 |
| WO | 2012153649 A1 | 11/2012 | | |
| WO | WO-2012153649 A1 * | 11/2012 | ............. | C03B 5/24 |
| WO | WO-2015095264 A2 * | 6/2015 | ......... | B23K 26/0622 |
| WO | WO-2015113595 A1 * | 8/2015 | ......... | C03B 23/0252 |
| WO | WO-2022047385 A1 * | 3/2022 | ............. | B33Y 10/00 |

OTHER PUBLICATIONS

Kohltech, "Glass Options", pp. 1-4, https://www.kohltech.com/wpcontent/uploads/2020/08/Kohltech-Glass-Options-Flyer-2020-Aug-10-2020.pdf, Jul. 27, 2020 (Jul. 27, 2020).

* cited by examiner

HISTORICALLY ACCURATE SIMULATED DIVIDED LIGHT GLASS UNIT AND METHODS OF MAKING THE SAME

CROSS REFERENCE TO RELATED APPLICATION(S)

This application is a national stage filing of International Application No. PCT/US21/48456, filed Aug. 31, 2021, which claims the benefit of U.S. Provisional Application No. 63/072,546, filed Aug. 31, 2020, which is incorporated by reference as if disclosed herein in its entireties.

BACKGROUND

Simulated divided light glass units are used in the production of historic-looking windows. The challenge with a simulated divided light glass unit is to make it look historically accurate. Traditionally, simulated divided light uses a single pane of glass and a wooden grill is applied to give the unit the appearance of being multiple, divided panes. For example, a 6-pane wooden grill can be applied to make it look like a true divided, historic, putty glazed 6-light sash. However, when using a single pane of glass, the surface reflects light in a very consistent way. A historic 6-pane true divided light glass unit reflects light differently because each pane of glass is set in its own horizontal plane.

Current reproduction glass manufactures simply "cook" new float glass at specific temperatures and durations to create "wavy" restoration glass. However, the original surface characteristics are not reproduced because the original, historic cylinder glass was made differently. As a result, the glass is usually very uneven, too wavy and warped, contain too many bubbles, and prevent the application of edge sealing. Edge sealing is important in modern insulated glass units because the edge sealing counteracts fogging and condensation and retains gases that can be used to increase the efficiency of the window unit. Thus, the current reproduction glass methods result in glass that cannot be used in a modern, insulated glass unit.

Therefore, a need exists for an improved method of making a simulated divided light glass unit that accurately replicates a historic glass pane. Such a divided light glass unit is preferably configured to be incorporated into an insulated glass unit.

SUMMARY

Some embodiments of the present disclosure include a method of forming a simulated divided light glass pane. In some embodiments, the method includes scanning, with a 3D scanner, at least one pane of a divided light glass window to obtain surface characteristics data for the at least one pane, designing a single replication pane of a divided light glass window based on the surface characteristics data of one or more of the at least one pane, printing, with a 3D printer, at least one mold of the single replication pane, positioning a quantity of glass on the at least one mold, and heating the glass to a desired temperature to slump the glass over the at least one mold to form a simulated divided light glass pane. In some embodiments, the method includes providing one or more low-e glass layers to the simulated divided light glass pane and disposing one or more spacer grills between the simulated divided light glass pane and the one or more low-e glass layers. In some embodiments, scanning at least one pane of a divided light glass window to obtain surface characteristics data for the panes includes scanning a plurality of panes having different surface characteristics. In some embodiments, the scanning step includes spraying the at least one pane with an anti-reflection coating and placing a plurality of reflective markers across a surface of the at least one pane. In some embodiments, heating the glass to a desired temperature to slump the glass over the ceramic positive mold is performed via a kiln.

In some embodiments, the at least one mold includes a plurality of slumped areas each replicating surface characteristics of a corresponding one of the at least one pane, and a plurality of flattened areas defining perimeters of the plurality of slumped areas. In some embodiments, the flattened areas include a perimeter area, a grill area, or combinations thereof, of the simulated divided light glass pane. In some embodiments, the at least one mold is composed of furan resin sand. In some embodiments, the 3D scanner has an accuracy of at least 0.02 mm. In some embodiments, the 3D printer is a stereolithography printer having a resolution of at least 0.05 mm.

In some embodiments, the method includes building a positive mold from the at least one mold. In some embodiments, building a positive mold from the at least one mold includes applying a release agent to the at least one mold, disposing at least one layer of a ceramic refractory composite material into the at least one mold up to a desired thickness to form a positive mold, and curing the positive mold.

Some embodiments of the present disclosure includes a method of forming a simulated divided light glass pane. In some embodiments, the method includes scanning, with a 3D scanner, a plurality of panes of one or more divided light glass windows to obtain surface characteristics data for the panes, designing a single replication pane of a divided light glass window based on the surface characteristics data of the plurality of panes, casting a mold of the single replication pane, the mold composed of furan resin sand, positioning at least one layer of glass on the mold, and heating the glass to slump the glass over the mold to form a simulated divided light glass pane. In some embodiments, the method includes providing one or more low-e glass layers to the simulated divided light glass pane and disposing one or more spacer grills between the simulated divided light glass pane and the one or more low-e glass layers.

In some embodiments, the single replication pane includes a plurality of slumped areas each replicating surface characteristics of at least one pane of a divided light glass window and a plurality of flattened areas defining perimeters of the single replication pane and the plurality of slumped areas. In some embodiments, the surface characteristics of each of the plurality of slumped areas of the simulated divided light glass pane are unique, and the simulated divided light glass pane includes at least 6 slumped areas positioned in a grid.

Some embodiments of the present disclosure includes an insulated glass unit. In some embodiments, the insulated glass unit includes a simulated divided light glass pane including a plurality of slumped areas replicating surface characteristics of at least one pane of a divided light glass window and a plurality of flattened areas defining perimeters of the plurality of slumped areas. In some embodiments, the insulated glass unit includes one or more low-e glass layers. In some embodiments, the insulated glass unit includes one or more spacer grills between the simulated divided light glass pane and the one or more low-e glass layers. In some embodiments, the simulated divided light glass pane includes a single glass pane molded into a replication of a historic true divided light glass window. In some embodiments, the insulated glass unit a sash disposed along substantially an entire perimeter of the simulated divided light glass pane.

In some embodiments, the one or more spacer grills include an outer seal to seal the perimeters of the simulated divided light glass pane and the one or more low-e glass layers. In some embodiments, the surface characteristics of each of the plurality of slumped areas of the simulated divided light glass pane are unique. In some embodiments, the simulated divided light glass pane includes at least 6 slumped areas positioned in a grid.

In some embodiments, the simulated divided light glass pane is formed by a process including designing a single replication pane based on surface characteristics data of one or more panes from divided light glass windows, printing, with a 3D printer, a mold of the single replication pane, positioning at least one layer of glass on the mold, and heating the glass to slump the glass over the mold.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein.

DETAILED DESCRIPTION OF EMBODIMENTS OF THE TECHNOLOGY

In the following specification and the claims which follow, reference will be made to a number of terms, which shall be defined to have the following meanings.

The singular forms "a", "an" and "the" include plural referents unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about", is not to be limited to the precise value specified. In some instances, the approximating language may correspond to the precision of an instrument for measuring the value.

Ranges of numerical values, e.g., from about 2 to about 7, as used herein throughout the specification and claims, include all values falling within the range as well as the boundaries of the given range. As an example, the range of "from about 2 to about 7" includes the values 2 and 7 and every fraction therebetween, e.g., 2.05, 2.10, 2.12, etc.

Accordingly, embodiments of the present technology are directed to a simulated divided light glass unit and methods of making the glass unit. Preferably, the glass unit is historically accurate, energy efficient, and low maintenance. In some embodiments, the method results in historically accurate glass unit replications, e.g., exact copies, of true divided light glass windows that offer the correct replacement fenestration for historic buildings, such as 19th century stone buildings.

Figure 1A:
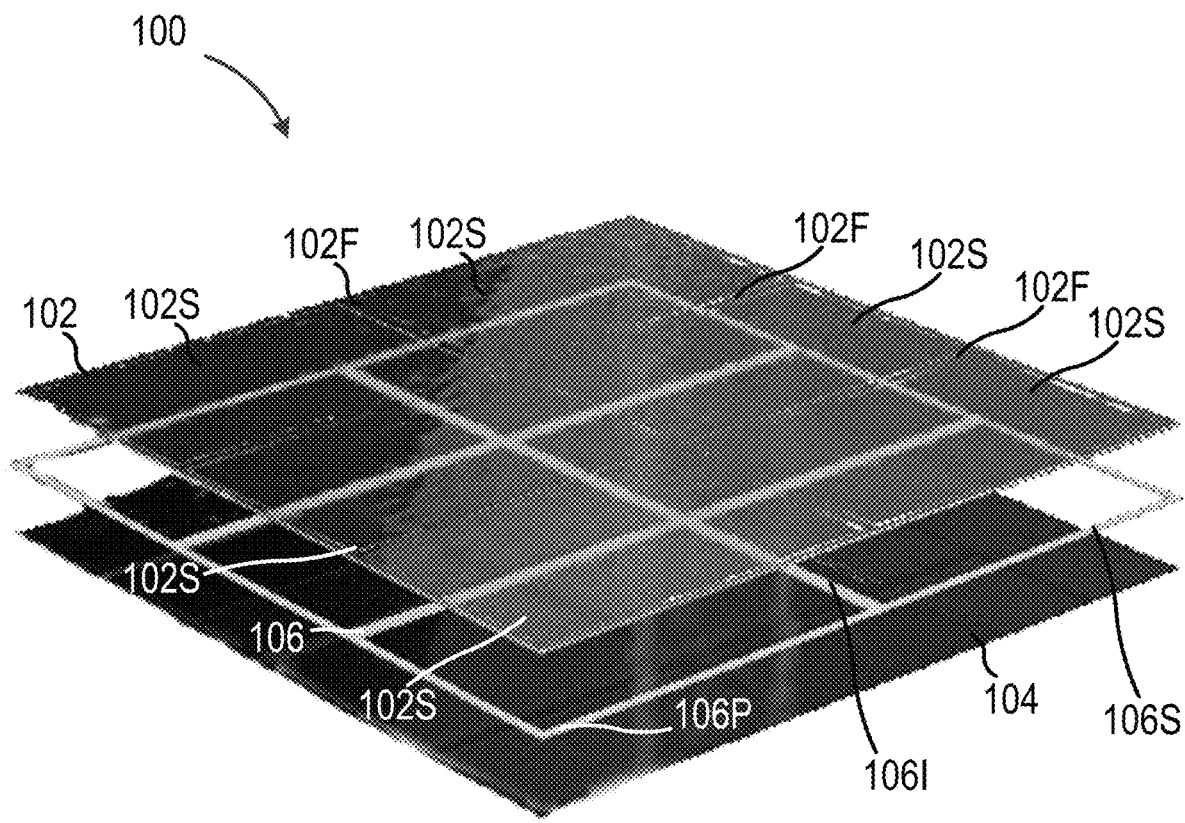
FIG. 1A is an exploded, schematic representation of an insulated glass unit according to some embodiments of the present disclosure.
Figure 1B:
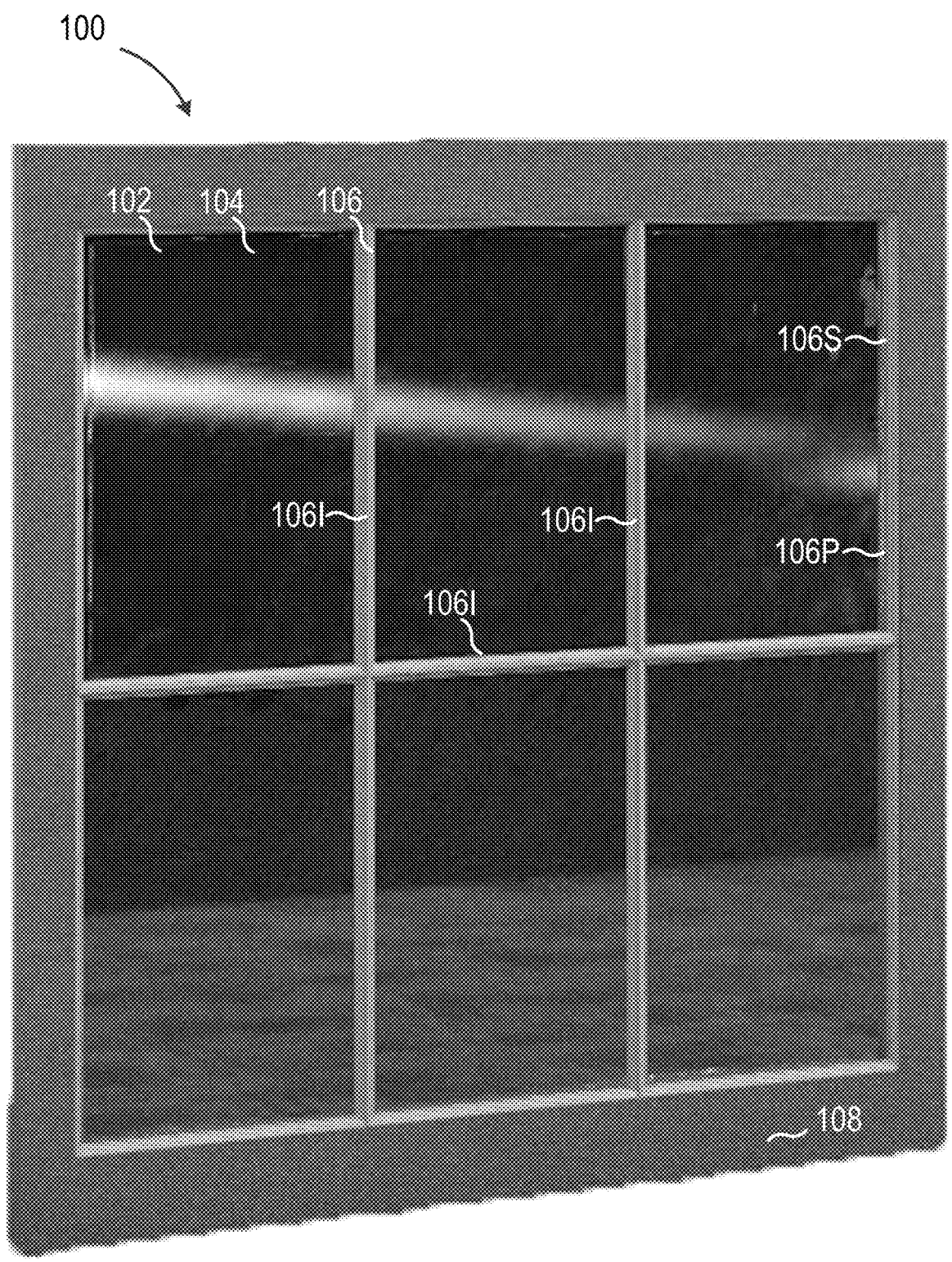
FIG. 1B is a schematic representation of an insulated glass unit according to some embodiments of the present disclosure.

Referring now to FIGS. 1A-1B, some embodiments of the present disclosure are directed to an insulated glass unit 100. Elements of insulated glass unit 100 depicted in FIG. 1B are reproduced via an exploded view in FIG. 1A for clarity. In some embodiments, insulated glass unit 100 includes one or more simulated divided light glass panes 102. In some embodiments, insulated glass unit 100 includes a plurality of simulated divided light glass panes 102. In some embodiments, simulated divided light glass pane 102 includes a plurality of slumped areas 102S. Slumped areas 102S replicate surface characteristics of panes of a divided light glass window, e.g., a true $19^{th}$ century glass window pane, as will be discussed in greater detail below. In some embodiments, the surface characteristics of slumped areas 102S include elements of the surface topography of panes of a divided light glass window, e.g., depressions, ridges, swirls, etc., or combinations thereof. In some embodiments, simulated divided light glass pane 102 includes a plurality of flattened areas 102F. In some embodiments, flattened areas 102F define perimeters of slumped areas 102S, at least a portion of the perimeter of simulated divided light glass pane 102, or combinations thereof. In some embodiments, simulated divided light glass pane 102 is formed of a single contiguous piece of material. In some embodiments, simulated divided light glass pane 102 is formed of a single contiguous piece of glass, polymer, or combinations thereof. In some embodiments, simulated divided light glass pane 102 is a single pane molded into a replication of a historic true divided light glass window. The carefully molded/slumped, single piece of glass provides the correct look for replicating antique, e.g., circa 1890-1900 glass panes, and is thus advantageous for use in building historically accurate, insulated high-performance glass units. In some embodiments, the surface characteristics of slumped areas 102S are unique, i.e., no two slumped areas 102S in simulated divided light glass pane 102 are identical. In some embodiments, at least two slumped areas 102S in simulated divided light glass pane 102 are identical. In some embodiments, simulated divided light glass pane 102 includes two or more slumped areas 102S. In some embodiments, simulated divided light glass pane 102 includes 4 or more slumped areas 102S. In some embodiments, simulated divided light glass pane 102 includes 6 or more slumped areas 102S. In some embodiments, simulated divided light glass pane 102 includes 8, 10, 12, or more slumped areas 102S. In some embodiments, slumped areas 102S are positioned in a grid.

As will be discussed below in greater detail, in some embodiments, simulated divided light glass pane 102 is formed by first designing a single replication pane based on surface characteristics data of one or more panes from divided light glass windows. In some embodiments, a mold of the single replication pane printing is printed and/or cast, e.g., with a 3D printer. In some embodiments, at least one layer of material, e.g., glass, polymer, or combinations thereof, is positioned on the mold. Finally, in some embodiments, the layer of material is heated to slump the material over the mold and forms simulated divided light glass pane 102.

Still referring to FIGS. 1A-1B, in some embodiments, insulated glass unit 100 includes one or more high-efficiency layers 104. In some embodiments, high-efficiency layers 104 have an improved resistance to conductive heat flow compared to standard glass, e.g., have a higher R-value than a single pane of glass, which is about R1, as well as any other desired advantages (anti-reflective coatings, anti-scratch coatings, etc., or combinations thereof). In some embodiments, high-efficiency layers 104 include low-e glass layers. In some embodiments, insulated glass unit 100 includes one or more spacer grills 106 positioned between simulated divided light glass pane 102 and high-efficiency layers 104. In some embodiments, spacer grills 106 include an outer grill 106P, an inner grill 106I, or combinations thereof. In some embodiments, spacer grills 106 are secured to simulated divided light glass 102, secured to high-efficiency layers 104, or combinations thereof. In some embodiments, spacer grills 106 include an outer seal 106S to seal perimeters of simulated divided light glass pane 102 and high-efficiency layers 104. In some embodiments, insulated glass unit 100 includes a sash 108. In some embodiments, sash 108 is disposed along substantially an entire perimeter of simulated divided light glass pane 102.

Thus, simulated divided light glass panes 102 replicating the look of true divided light glass windows are incorporated into insulted glass unit 100. Having created flat surfaces for sealing insulted glass unit 100 and securing spacer grills 106, and further replicating the optics of the original historic glass, this one-piece pane 102 can be used in a simulated divided light application. These historical, energy efficient insulated glass units can be fabricated at a desired size so as to be installed in almost any window opening and replicate a historical look. Such accurate replication of each specific window enables a historic building to be renovated to have modern insulated windows while retaining the original historic appearance. For example, insulted glass unit 100 can be installed in a building such that an exterior-facing simulated divided light glass pane 102 provides a historic appearance for outside the building, and an interior-facing high-performance low-e glass 104 provides modern efficiency for inside the building. In some embodiments, insulted glass unit 100 includes an exterior-facing high-efficiency layer 104. In some embodiments, insulated glass unit 100 includes an exterior-facing high-efficiency layer 104 and an interior-facing high-efficiency layer 104. In some embodiments, exterior-facing simulated divided light glass 102 is also formed of low-e glass. Thus, in some embodiments, the present technology contemplates use of high-efficiency, e.g., low-e, glass for an exterior pane, an interior pane, or both of an insulated glass unit. This permits the creation of an insulated glass unit that can be adjusted for any climate by changing the mix or placement of high-efficiency glass. This look, e.g., of individual antique panes, is provided with up to 75% less sealing compared to, e.g., 6 actual divided lights. As the seal is the weakest point in a glass unit, the embodiments of the present disclosure provide a significant improvement in longevity and efficiency.

Figure 2:
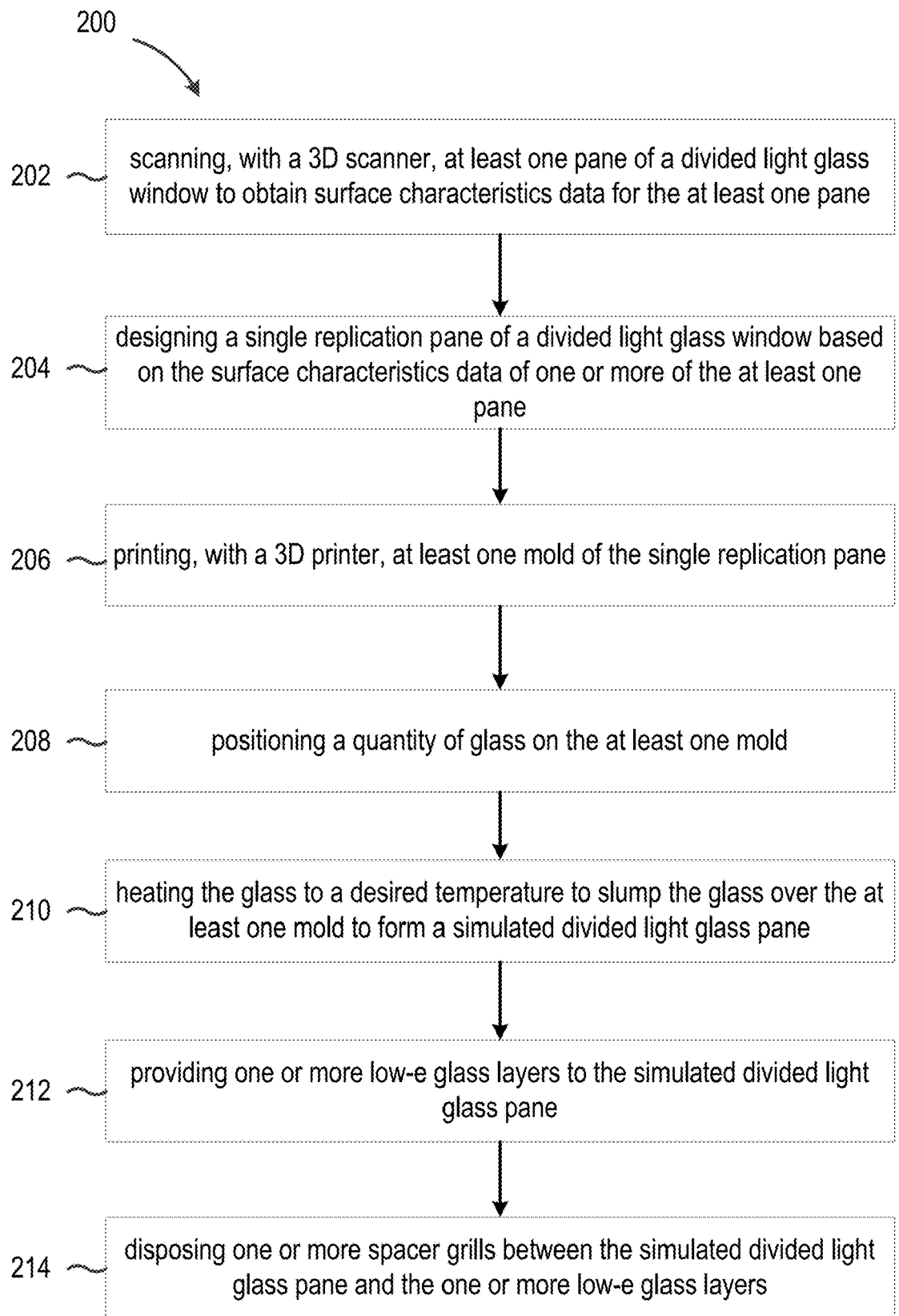
FIG. 2 is a chart of a method of making an insulated glass unit according to some embodiments of the present disclosure.
Figure 3:
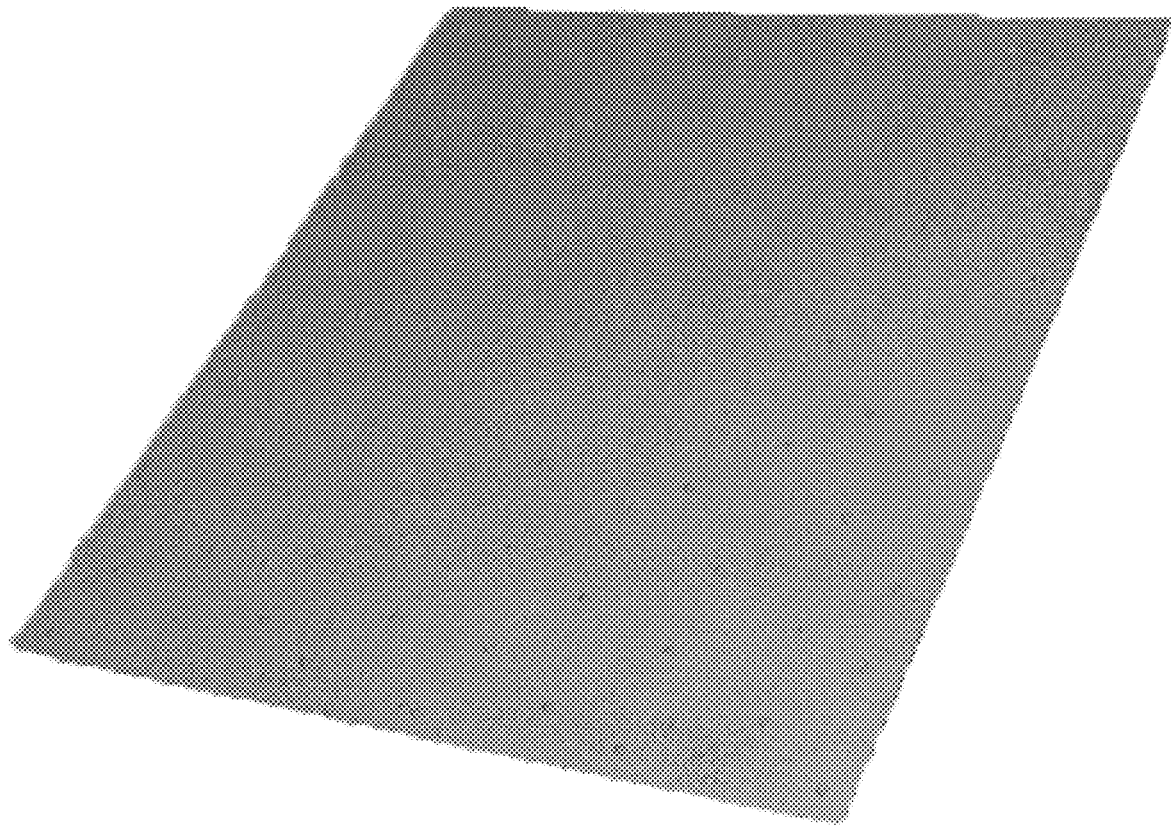
FIG. 3 is a schematic representation of a point cloud of an insulated glass unit according to some embodiments of the present disclosure.

Referring now to FIG. 2, some embodiments of the present disclosure are directed to a method 200 of forming a simulated divided light glass pane. At 202, at least one pane of a divided light glass window is scanned to obtain surface characteristics data for that pane. In some embodiments, a plurality of panes having different surface characteristics are scanned. In some embodiments, scanning 202 is performed with any suitable 3D scanner. In some embodiments, the 3D scanner has an accuracy of at least 0.1 mm. In some embodiments, the 3D scanner has an accuracy of at least 0.05 mm. In some embodiments, the 3D scanner has an accuracy of at least 0.025 mm. In some embodiments, the 3D scanner has an accuracy of at least 0.02 mm. In some embodiments, the 3D scanner has an accuracy of at least 0.01 mm. In some embodiments, scanning 202 creates a point cloud, as shown in FIG. 3. As used herein, a point cloud refers to a database of points in a 3D coordinate system. The points in the point cloud are located on the external surfaces of objects that are detectable by the 3D scanner. Notably, a point cloud can be a very accurate digital record of an object. In some embodiments, the scanned point cloud is converted to a mesh file and transferred to a CAD software to visualization, manipulation, etc. In some embodiments, these scans are stored in a CAD library with other antique glass scans, e.g., from 19$^{th}$ century and early 20$^{th}$ century glass panes.

Referring again to FIG. 2, in some embodiments, method 200 effectively captures historic cylinder glass surfaces in exacting detail by scanning historic 19$^{th}$ century cylinder glass using a 3D high-definition scanner. In some embodiments, the scanner captures the topography, waves, indents, and/or unevenness found in glass surfaces, such as those found on original 19$^{th}$ century cylinder glass window panes. In some embodiments, scanning 202 includes spraying the pane to be scanned with an anti-reflection coating and placing one or more reflective markers across a surface of the pane. In some embodiments, scanning 202 includes placing a plurality of reflective markers across a surface of the pane. Scanning glass can be difficult because the scan generally passes through the glass without detecting the glass's features. Thus, it can be advantageous to provide an opaque environment to enable the scanner to detect the glass. In some embodiments, an opaque environment is created by spraying the historic cylinder glass with an anti-reflection coating, such as a matte opaque coating, which prevents the scan from passing through the glass and, thus, permits the scan to detect the surfaces features of the glass. In other embodiments, the 3D scanner has adjustable exposure settings to compensate for transparent surfaces such that an anti-reflection coating is not required. As mentioned above, in some embodiments, reflective markers are placed on the surface of the glass as registration points. In some embodiments, the reflective markers are randomly placed. In some embodiments, the reflective markers are placed in specific points, to form, e.g., an ordered grid.

Still referring to FIG. 2, at 204, a replication pane, e.g., a 3D model, of a divided light glass window is designed based on the surface characteristics data of one or more of the scanned panes. In some embodiments, the replication pane is a single contiguous piece. As discussed above with respect to simulated divided light glass panes 102, in some embodiments, the replication pane includes a plurality of slumped areas and a plurality of flattened areas. The slumped areas replicate surface characteristics of panes of a divided light glass window such as elements of the surface topography of panes of a divided light glass window, e.g., depressions, ridges, swirls, etc., or combinations thereof. In some embodiments, the flattened areas define perimeters of slumped areas, at least a portion of the perimeter of the replication pane, or combinations thereof. As discussed above, in some embodiments, the simulated divided light glass pane is formed of a single contiguous piece of glass, polymer, or combinations thereof. Thus, in some embodiments, the replication pane is a single pane replication of a historic true divided light glass window. In some embodiments, the surface characteristics of the slumped areas are designed to be unique, i.e., no two slumped areas are identical. In some embodiments, at least two slumped areas are designed to be identical. In some embodiments, the replication pane is designed with two or more slumped areas. In some embodiments, the replication pane is designed with 4 or more slumped areas. In some embodiments, the replication pane is designed with 6 or more slumped areas. In some embodiments, the replication pane is designed with 8, 10, 12, or more slumped areas. In some embodiments, the slumped areas are designed to be in a grid. In some embodiments, the slumped areas are multiple cylinder glass surface files selected from the CAD library.

In an exemplary embodiment, historic cylinder glass CAD scans were used to design a single pane of glass that replicates the 6 different fields of a true divided 6 pane window. The CAD scan was also used to define flat areas beneficial for edge sealing and attaching a spacer grill. In this embodiment, a topography scan established the surface details, and then glass, in this case. In some embodiments, the panes are aligned and stitched together into one object. In some embodiments, each individual pane is supplied a modifier that controls corners and edges, giving complete control over the desired reflective properties. In some embodiments, the panes are tilted/adjusted to achieve the correct/desired reflective properties. In some embodiments, the panes are individually modified in CAD to flatten the edges of the pane. In some embodiments, edge flat dimensions are equal to that of the grill width, the inner edge flats are done to half that dimension. By limiting flattening to the edges, the glass waves and imperfections are accurately captured, providing the desired light distortions. The perimeter and grill areas are then laid out. Although the exemplary embodiment is directed to a divided light glass unit that simulates 6 panes, as discussed above, the present disclosure contemplates divided light glass units that simulate any number of panes, such as 2, 4, 6, 8, 10, 12, etc.

Still referring to FIG. 2, in some embodiments, the 3D model is sent to a 3D printer. At 206, at least one mold of the replication pane is printed. In some embodiments, the mold is printed with a 3D printer. In some embodiments, the 3D printer is a furan resin sand printer and the mold is composed of furan resin sand. Furan resin sand casting is a no-bake sand mold process, which furan resin plays a role as a bonding agent. This molding technique maintains high casting quality and a smooth surface finish. The 3D printer selectively dispenses resin onto thin layers of specially engineered sand. A printhead offering precise dosing of the furan binding agent produces accurate molds rapidly. The molds are almost instantly ready after 3D printing. The 3D sand mold captures the surface characteristics of historic cylinder glass, with the slumped areas creating the look of the individual panes and the flat perimeter and grill locations molded for flatness, which is highly advantageous for glass unit construction.

In some embodiments, the 3D printer prints a 3D negative mold that reproduces the surface characteristics of historic cylinder glass. In some embodiments, the 3D printer is a stereolithography printer having a resolution of at least 0.05 mm. This technology converts liquid materials into solid parts, layer-by-layer, by curing them using a process called photopolymerization, which gives a smooth surface and accurate detail. In some embodiments, a positive mold is built from the mold, e.g., the negative mold. In some embodiments, building a positive mold includes applying a release agent to the at least one mold, disposing at least one layer of a ceramic refractory composite material into the at least one mold up to a desired thickness to form a positive mold, and curing the positive mold. After the positive mold is cured, it can be used to create a simulated divided light glass unit according to embodiments of the present disclosure.

In some embodiments, the mold formation steps described above are reversed, such that a positive mold is 3D printed and used to form a negative mold that is used for the glass slumping discussed below. In some embodiments, corresponding positive and negative ceramic molds are formed as described above, which are then used simultaneously with the glass positioned between the positive and negative molds for slumping.

At 208, a quantity of material is positioned on the mold. As discussed above, in some embodiments, the material includes glass, polymer, or combinations thereof. At 210, the material, e.g., glass, is heated to a desired temperature to slump the material over the mold to form a simulated divided light glass pane. As discussed above, the mold includes a plurality of slumped areas each replicating surface characteristics of one or more panes, and a plurality of flattened areas defining perimeters of the plurality of slumped areas. In some embodiments, the flattened areas include a perimeter area, a grill area, or combinations thereof, of the simulated divided light glass pane. The desired temperature is any suitable temperature to allow the material to slump over the mold. In some embodiments, heating 210 is performed via application of heat from any suitable heat source. In some embodiments, the heat source is a kiln. In an exemplary embodiment, new float glass is placed on a ceramic positive mold, and an electric kiln is programed to heat the glass at very specific one or more temperature settings and one or more-time durations to create the correct waviness for the period cylinder glass, e.g., 19th century glass. When the glass reaches a correct temperature, it slumps into the ceramic mold to imbue the correct historical surface characteristics onto the exterior surface of the replicated cylinder glass. In some embodiments, as the glass reaches a correct temperature, each area slumps in the mold to tilt the individual panes for the correct reflective characteristics of, e.g., a true divided individual paned 19th century window. This tilting process can increase the authenticity of the simulated divided light glass by mimicking the historic process of individually hand-pressing each separate pane into its respective plane. In some embodiments, when the glass reaches a correct temperature, the glass perimeter and the grill bar areas are slumped in the mold for flatness. As discussed above, in some embodiments, exterior grill locations are on an outer surface of the glass. In some embodiments, the glass is annealed during a cooling phase. In some embodiments, the float glass is monolithic glass. In some embodiments, the float glass is low-e glass.

At 212, one or more high-efficiency layers are provided to the simulated divided light glass pane. In some embodiments, the high-efficiency layers include low-e glass layers. At 214, one or more spacer grills are disposed between the simulated divided light glass pane and the high-efficiency layers.

Figure 4:
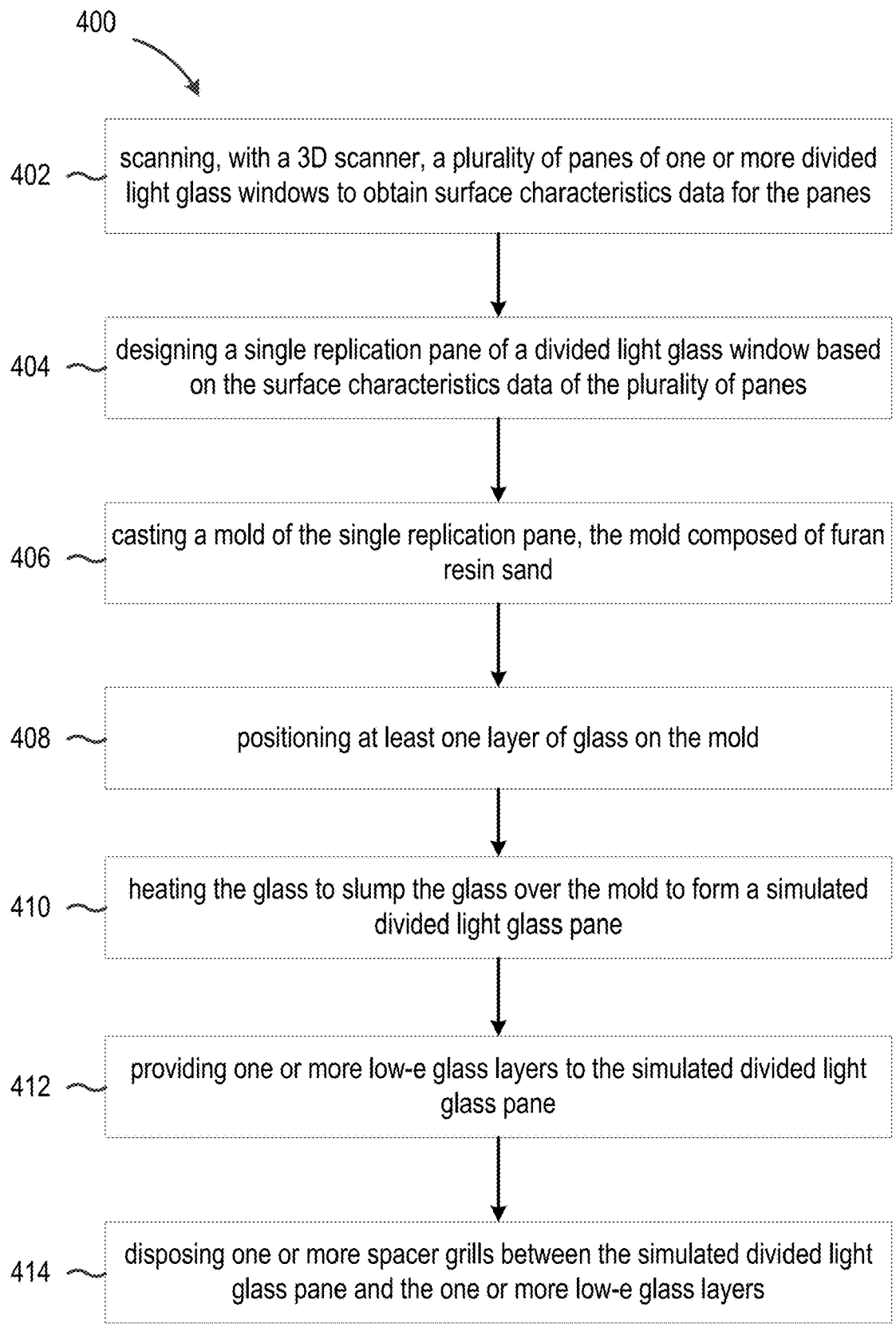
FIG. 4 is a chart of a method of making an insulated glass unit according to some embodiments of the present disclosure.

Referring now to FIG. 4, some embodiments of the present disclosure include a method 400 of forming a simulated divided light glass pane. At 402, a plurality of panes of one or more divided light glass windows are scanned to obtain surface characteristics data for the panes. At 404, a single replication pane of a divided light glass window is designed based on the surface characteristics data of the plurality of panes. As discussed above, the single replication pane includes a plurality of slumped areas each replicating surface characteristics of at least one pane of a divided light glass window and a plurality of flattened areas defining perimeters of the single replication pane and the plurality of slumped areas. In some embodiments, the surface characteristics of each of the plurality of slumped areas of the simulated divided light glass pane are unique, and the simulated divided light glass pane includes at least 6 slumped areas positioned in a grid. At 406, a mold of the single replication pane is cast. In some embodiments, the mold is composed of furan resin sand. At 408, at least one layer of glass is positioned on the mold. At 410, the glass is heated to slump the glass over the mold to form a simulated divided light glass pane. At 412, one or more low-e glass layers is provided to the simulated divided light glass pane. At 414, one or more spacer grills is disposed between the simulated divided light glass pane and the one or more low-e glass layers.

As discussed above methods and systems of the present disclosure, e.g., insulated glass unit 100, method 200, and method 400, accurately capture and replicate the unique features and differences of historic glass window panes. For example, methods 200 and 400 can accurately capture the differences between a glass window pane from 1890 and a glass window pane from 1900. Furthermore, these methods can accurately capture the differences between glass window panes from the same historic period. For example, every glass window pane in a historic building from 1890 may have unique features different from every other glass window pane in the building, the overall effect of which can be captured via methods 200 and 400 to create insulated glass units 102 that faithfully recreate the desired aesthetic features of the glass in the historic building without sacrificing efficiencies achievable via modern window technology.

As will be apparent to those skilled in the art, various modifications, adaptations and variations of the foregoing specific disclosure can be made without departing from the scope of the invention claimed herein. The various features and elements of the invention described herein may be combined in a manner different than the specific examples described or claimed herein without departing from the scope of the invention. For example, method 200 can use a 3D scanner having an accuracy of about 0.015 mm and a stereolithography printer having a resolution of about 0.04 mm in accordance with the disclosure provided herein. However, it is also contemplated method 200 can use a 3D scanner having an accuracy of about 0.045 mm and a furan resin sand printer. Other combinations not specifically listed herein are contemplated by the inventors and are understood to be encompassed by the disclosure provided herein. In other words, any element or feature may be combined with any other element or feature in different embodiments, unless there is an obvious or inherent incompatibility between the two, or it is specifically excluded.

Although the technology has been described and illustrated with respect to exemplary embodiments thereof, it should be understood by those skilled in the art that the foregoing and various other changes, omissions, and additions may be made therein and thereto, without parting from the spirit and scope of the present technology.

What is claimed is:

1. A method of forming a simulated divided light glass pane, comprising the steps of:
   scanning, with a 3D scanner, at least one pane of a divided light glass window to obtain surface characteristics data for the at least one pane;
   designing a single replication pane of the divided light glass window based on the surface characteristics data of one or more of the at least one pane;
   printing, with a 3D printer, at least one mold of the single replication pane;
   positioning a quantity of glass on the at least one mold; and
   heating the glass to a desired temperature to slump the glass over the at least one mold to form a simulated divided light glass pane.

2. The method of claim 1, wherein the at least one mold includes a plurality of slumped areas each replicating surface characteristics of a corresponding one of the at least one pane, and a plurality of flattened areas defining perimeters of the plurality of slumped areas.

3. The method of claim 2, wherein the flattened areas include a perimeter area, a grill area, or combinations thereof, of the simulated divided light glass pane.

4. The method of claim 1, further comprising:
   providing one or more low-e glass layers to the simulated divided light glass pane; and
   disposing one or more spacer grills between the simulated divided light glass pane and the one or more low-e glass layers.

5. The method of claim 1, wherein scanning at least one pane of a divided light glass window to obtain surface characteristics data for the panes includes:
   scanning a plurality of panes having different surface characteristics.

6. The method of claim 1, wherein the at least one mold is composed of furan resin sand.

7. The method of claim 1, wherein heating the glass to the desired temperature to slump the glass over the at least one mold is performed via a kiln.

8. The method of claim 1, wherein the 3D scanner has an accuracy of at least 0.02 mm, and the scanning step further comprises:
   spraying the at least one pane with an anti-reflection coating; and
   placing a plurality of reflective markers across a surface of the at least one pane.

9. The method of claim 1, wherein the 3D printer is a stereolithography printer having a resolution of at least 0.05 mm.

10. The method of claim 1, further comprising building a positive mold from the at least one mold.

11. The method of claim 10, wherein building the positive mold from the at least one mold further comprises:
    applying a release agent to the at least one mold;
    disposing at least one layer of a ceramic refractory composite material into the at least one mold up to a desired thickness to form the positive mold; and
    curing the positive mold.

12. An insulated glass unit, comprising:
    a simulated divided light glass pane including:
       a single contiguous glass pane;
       the single contiguous glass plane having a plurality of glass slumped areas comprising surface characteristics;
       the surface characteristics of each of the plurality of slumped areas of the simulated divided light glass pane include at least one of waves, indents, unevenness, depressions, ridges, or swirls;
       a plurality of flattened areas defining perimeters of each of the plurality of slumped areas and the perimeter of the single contiguous glass pane;
       the plurality of flattened areas comprising a perimeter area located around the perimeter of the single contiguous glass pane and a grill area located between the slumped areas;

one or more low-e glass layers;
one or more spacer grills being secured to the grill area and located between the simulated divided light glass pane and the one or more low-e glass layersa;
wherein the simulated divided light glass pane is configured to replicate a cylinder glass true divided light glass window.

13. The insulated glass unit of claim 12, wherein the one or more spacer grills include an outer seal to seal the perimeters of the simulated divided light glass pane and the one or more low-e glass layers.

14. The insulated glass unit of claim 13, further comprising a sash disposed along substantially an entire perimeter of the simulated divided light glass pane.

15. The insulated glass unit of claim 12, wherein the simulated divided light glass pane includes at least 6 slumped areas positioned in a grid.

16. The insulated glass unit of claim 12, wherein the simulated divided light glass pane is formed by a process including:
designing a single replication pane based on surface characteristics data of one or more panes from divided light glass windows;
printing, with a 3D printer, a mold of the single replication pane; positioning at least one layer of glass on the mold; and
heating the glass to slump the glass over the mold.

17. A method of forming a simulated divided light glass pane, comprising the steps of:
scanning, with a 3D scanner, a plurality of panes of one or more divided light glass windows to obtain surface characteristics data for the panes;
designing a single replication pane of a divided light glass window based on the surface characteristics data of the plurality of panes, wherein the single replication pane includes:
a plurality of slumped areas each replicating surface characteristics of at least one pane of a divided light glass window, and
a plurality of flattened areas defining perimeters of the single replication pane and the plurality of slumped areas;
casting a mold of the single replication pane, the mold composed of furan resin sand;
positioning at least one layer of glass on the mold; and
heating the glass to slump the glass over the mold to form a simulated divided light glass pane.

18. The method of claim 17, further comprising:
providing one or more low-e glass layers to the simulated divided light glass pane; and
disposing one or more spacer grills between the simulated divided light glass pane and the one or more low-e glass layers.

19. The method of claim 17, wherein the surface characteristics of each of the plurality of slumped areas of the simulated divided light glass pane are unique, and the simulated divided light glass pane includes at least 6 slumped areas positioned in a grid.

* * * * *